United States Patent

Fujikura et al.

[11] Patent Number: 6,017,212
[45] Date of Patent: Jan. 25, 2000

[54] METHODS OF WINDING, ANNEALING AND UNWINDING A POLYMER FILM WEB, AN ANNEALING APPARATUS AND PHOTOGRAPHIC FILM SUPPORT PREPARED USING SAID METHOD OR APPARATUS

[75] Inventors: Daisuke Fujikura; Naoaki Suzuki; Takashi Nawano, all of Kanagawa, Japan

[73] Assignee: Fuji Photo Film Co., Ltd., Kanagawa, Japan

[21] Appl. No.: 09/228,394

[22] Filed: Jan. 12, 1999

Related U.S. Application Data

[62] Division of application No. 08/612,435, Mar. 7, 1996.

[30] Foreign Application Priority Data

| Mar. 9, 1995 | [JP] | Japan | 7-77086 |
| Mar. 9, 1995 | [JP] | Japan | 7-77088 |
| Mar. 14, 1995 | [JP] | Japan | 7-80833 |

[51] Int. Cl.[7] ............................................. F27B 9/28
[52] U.S. Cl. ............................................. 432/59; 432/8
[58] Field of Search ........................... 432/8, 59; 34/625, 34/626

[56] References Cited

U.S. PATENT DOCUMENTS

| 4,668,181 | 5/1987 | Bernauer . |
| 4,836,774 | 6/1989 | Harada et al. . |
| 5,585,229 | 12/1996 | Kawamoto et al. . |
| 5,634,789 | 6/1997 | Nawano et al. . |

FOREIGN PATENT DOCUMENTS

| 0 580 523 | 1/1994 | European Pat. Off. . |
| 0 665 463 | 8/1995 | European Pat. Off. . |
| 25 14 352 | 10/1975 | Germany . |
| B-50-36459 | 11/1975 | Japan . |
| B-57-36129 | 8/1982 | Japan . |
| 59-207346 | 11/1984 | Japan . |
| 1-109045 U | 7/1989 | Japan . |
| B-5-19899 | 3/1993 | Japan . |

OTHER PUBLICATIONS

Patent Abstracts of Japan, vol. 011, No. 347 (M–641), Nov. 13, 1987 for JP–A–62 127229 (Teijin Ltd), Jun. 9, 1987.
Patent Abstracts of Japan, vol. 013, No. 161 (M–815), Apr. 18, 1989 for JP–A–63 319126 (Teijin Ltd), Dec. 27, 1988.
Patent Abstracts of Japan, vol. 009, No. 077 (M–369), Apr. 6, 1985 for JP–A–59–207346 (Fuji Shashin Film KK), Nov. 24, 1984.

*Primary Examiner*—John A. Jeffery
*Assistant Examiner*—Jiping Lu
*Attorney, Agent, or Firm*—Sughrue, Mion, Zinn, MacPeak & Seas, PLLC

[57] ABSTRACT

A method of winding a polymer film web around a cylindrical core, where the core is heated by blowing hot-air against the core prior to winding the polymer film web, and the polymer film web is wound around the heated core while blowing hot-air against the polymer film web. In another embodiment of the winding method, the polymer film is wound while knurled along both edge parts in the width direction of the film to form knurls so as to gradually decrease in the thickness thereof from one end of the film that contacts with the core toward the other end of the film. Furthermore, a heat treating method for annealing a film roll and a heat treating apparatus therefor are disclosed, which method comprises the steps of surrounding the film roll with heat insulating panels and blowing hot-air against the film roll in the direction along the core axis while rotating the core intermittently or continuously at a rotary speed of from 0.04 to 4 revolutions per hour.

1 Claim, 1 Drawing Sheet

METHODS OF WINDING, ANNEALING AND UNWINDING A POLYMER FILM WEB, AN ANNEALING APPARATUS AND PHOTOGRAPHIC FILM SUPPORT PREPARED USING SAID METHOD OR APPARATUS

This is a divisional of U.S. Application Ser. No. 08/612,435 filed Mar. 7, 1996, the disclosure of which is incorporated herein by reference.

FIELD OF THE INVENTION

The present invention relates to a method of winding a continuous polymer film strip (hereinafter, occasionally called "web") into a roll, a method of annealing a film roll, and to a method of unwinding an annealed film roll. Furthermore, the present invention relates an apparatus for annealing a film roll and to a photographic film support prepared using one or more of the above methods or the above apparatus. Specifically, the present invention provides improved techniques for preparing a photographic film support by uniformly subjecting a polymer film web to heat or annealing treatment.

BACKGROUND OF THE INVENTION

Polymer films, particularly polyester films, are subjected to heat treatment to remove residual strain arising from their manufacturing process. This heat treatment is called an annealing treatment.

In carrying out such an annealing treatment, there has been adopted a method of storing a film which has been rolled up (a film roll) for predetermined time in a thermostatic chamber which is kept the temperature therein at a high temperature, or a method of slowly passing a film roll through a continuous oven. When a film roll is heated ununiformly in such an annealing process, various problems arise such that the film roll suffers starring, winding wrinkles or winding ruggedness. In addition, a prolonged period is required for effecting an annealing treatment.

To solve the above described problems, the following techniques have been proposed.

(1) JP-B-05-19899 (the term "JP-B" means an "examined Japanese patent publication") discloses a heat treating method where a film placed in an oven for heat treatment is heated up to a heat treatment temperature while it is continuously wound up into a roll as spacers are put along both side edges of the film, and then the spacer-interposed roll is stored at the heat treatment temperature for a predetermined time.

(2) JP-A-59-207346 (the term "JP-A" means an "unexamined published Japanese patent application") discloses an apparatus for winding a web equipped with an air chamber arranged at a predetermined interval with a web so that the web is subjected to hot-air blowing from air chambers to thereby control the web temperature.

However, any of the above-cited proposals (1) and (2) have no description about a core temperature. Therefore, these proposals is disadvantageous that a wound film shrinks because of the temperature deference with a core, which results in surface defects (such as wrinkles, ruggedness, scratches and the like). In addition, these proposals have a problem in controlling the winding tightness of a film roll.

Furthermore, to avoid the above described starring, winding wrinkles or winding ruggedness, and to prevent from generating elliptical distortion and wrinkles, JP-A-63-31962 discloses a method of storing a plastic film that has been wound onto a reel into a roll with a space rate of from 0.6 to 0.95 while rotating the reel centering around the reel axis at a speed of from 5 to 1,000 revolutions per hour.

The method as described in JP-A-63-31962 is successful in preventing the generation of the elliptical distortion and wrinkles upon long-term storage. However, it has problems that temperature ununiformity is locally present in a thermostatic chamber used therein, and therefore, the effects on the reduction of annealing time and on the enhancement of annealing efficiency are inadequate.

Furthermore, conventional methods cannot avoid ununiformity in heating upon annealing treatment which results in temperature ununiformity of a film roll between the core side part and the periphery side part, and ununiform loading.

In the conventional methods, the entire film roll of a polymer film web is cooled to room temperature (about 25° C.) after an annealing treatment, and thereafter the film roll is unwound.

An edge-thickening processing called "knurling", in which both edge parts of a polymer film web is deformed to be rugged, has so far been employed to prevent telescoping in the film roll. This knurling processing plays an important role in the above described annealing treatment as well, and it is not to be dispensed with for ensuring uniform heating and loading applied to a polymer film web.

Typical conventional techniques relating to edge-thickening processing, i.e., knurling, include the followings:

(3) JP-B-50-36459 discloses a method of winding a synthetic resin comprising subjecting a part of the film surface in the width direction (side zones on the film surface) to a treatment for enhancing antislip properties (specifically, a corona discharge treatment) followed by winding.

(4) JP-B-57-36129 discloses an apparatus for an edge thickening apparatus, with which edge parts of a molded thermoplastic sheet material are mechanically deformed to be rugged. Specifically, the apparatus comprises means for mechanical deforming which comprises a pair of rollers having a rugged surface and means for bringing them into pressure contact, in which at least one of the rollers has such surface roughness that striped gaps are arranged in the width direction on the curved surface of the roller so as to left traces of the gaps on the parts to thicken the sheet material.

(5) JP-A-U-01-109045 (the term "JP-A-U" means an "unexamined published Japanese utility model application") discloses an apparatus for winding a plastic film equipped with a heating device which enables hot-air to blow against both side edges of the film, to thereby locally form rough portions on the film surface.

In the conventional techniques, however, measures were not sufficiently taken to the problem that a film roll as a whole lacks uniformity in heated and loaded conditions. Furthermore, although the disclosed techniques relating to the knurling processing are effective measures to telescoping, there is no description with respect to measures for avoiding ununiformity on the film roll between the core side part and the surface side part occurring in an annealing treatment. In addition, these techniques do not provide sufficient effect for achieving suitable unwinding of a polymer film web from a roll that has been annealed. As a result, many defects occur in the film roll during and after the annealing treatment. Specifically, sharp swelling, cut-end-mark and imprints of a core texture are generated in the core part and ruggedness are generated in the periphery part during or after the annealing treatment. Furthermore, telescoping, starring wrinkles and wrinkles around the core are generated in an unwinding operation after the annealing treatment.

SUMMARY OF THE INVENTION

Therefore, a first object of the present invention is to provide a method of winding a film web into a film roll and a method of annealing the film roll, which cause no surface defects arising from film shrinkage attributed to the core temperature (such as wrinkles, ruggedness and scratches) by adopting an effective method for heating the core, and in which the film is wound under an uniform temperature condition and the winding tightness of the film roll can be controlled to provide sufficient effects upon reduction in winding wrinkles and winding ruggedness.

A second object of the present invention is to provide a method and an apparatus for heat treatment of film roll(s), which enable efficient and rapid annealing treatment as well as sufficient reduction of surface defects such as winding wrinkles, winding ruggedness which are caused in film rolls upon annealing, resulting in effective annealing of a large quantity of film rolls.

A third object of the present invention is to provide a method of winding a polymer film web into a film roll and a method of annealing the film roll, which can reduce the generation of conventional defects including sharp swelling, cut-end-mark and imprints of a core texture which occur in the core side part of the film roll and ruggedness caused in the periphery side part of the film roll, and which can reduce the generation of defects on a rolled film surface in a cooling step after the annealing treatment (such as telescoping, starring and wrinkles around the core).

A fourth object of the present invention is to provide a photographic film support prepared using one or more of the above described methods and an apparatus.

The above objects of the present invention has been achieved by providing the following methods, apparatus and film support:

(1) a method of winding a polymer film web around a cylindrical core, which comprises the steps of:
providing a winding chamber enclosed with a heat insulating material for surrounding the cylindrical core;
heating the core by blowing hot-air having a temperature of from 60° C. to 140° C. against the core; and
winding the polymer film web around the heated core while blowing hot-air having a temperature of from 60° C. to 140° C. against the polymer film;

(2) a method of winding a polymer film web around a cylindrical core, comprising the steps of:
providing a polymer film web and a cylindrical core; and
winding the polymer film web around the cylindrical core while subjecting it to a knurling processing along both edge parts in the width direction of the film to form knurls so as to gradually decrease in the thickness thereof from one end of the film that contacts with the core toward the other end of the film;

(3) a method of annealing a polymer film web, which comprises the steps of:
winding the polymer film web around a cylindrical core by a process comprising the steps of:
providing a winding chamber enclosed with a heat insulating material for surrounding the cylindrical core;
heating the core by blowing hot-air having a temperature of from 60° C. to 140° C. against the core; and
winding the polymer film web around the heated core while blowing hot-air having a temperature of from 60° C. to 140° C. against the polymer film;

transporting the wound polymer film roll into a thermostatic chamber while keeping the temperature thereof; and
allowing the wound polymer film roll to stand for from 6 minutes to 1,500 hours in a thermostatic atmosphere having a temperature of from 60° C. to 140° C.;

(4) a heat treatment method for annealing a film roll of a polymer film web wound around a cylindrical core, the method comprising the steps of:
surrounding the film roll with heat insulating panel(s); and
blowing hot-air against the film roll in the direction along the core axis while rotating the core intermittently or continuously at a rotary speed of from 0.04 to 4 revolutions per hour;

(5) a heat treatment apparatus for annealing a film roll of a polymer film web wound around a cylindrical core, the apparatus comprising:
a flatcar on which the film roll is mounted;
a heat insulating panel which is arranged to form a chamber for surrounding the film roll on the flatcar;
a pair of rollers which support the core;
a motor which provides power for rotating the core intermittently or continuously via the rollers; and
a port for introducing hot air into the chamber which is provided in one side of the chamber that faces one edge of the film roll;

(6) a method of unwinding a wound film roll of a polymer film web, comprising the steps of;
providing a wound film roll;
subjecting the wound film roll to an annealing treatment where the film roll is heated to be in a high temperature state; and
unwinding the annealed film roll while the polymer film web is still in the high temperature state;

(7) a photographic film support prepared from a polymer film web by employing one or more of the above described methods and/or apparatus.

DETAILED DESCRIPTION OF THE INVENTION

Figure 1:
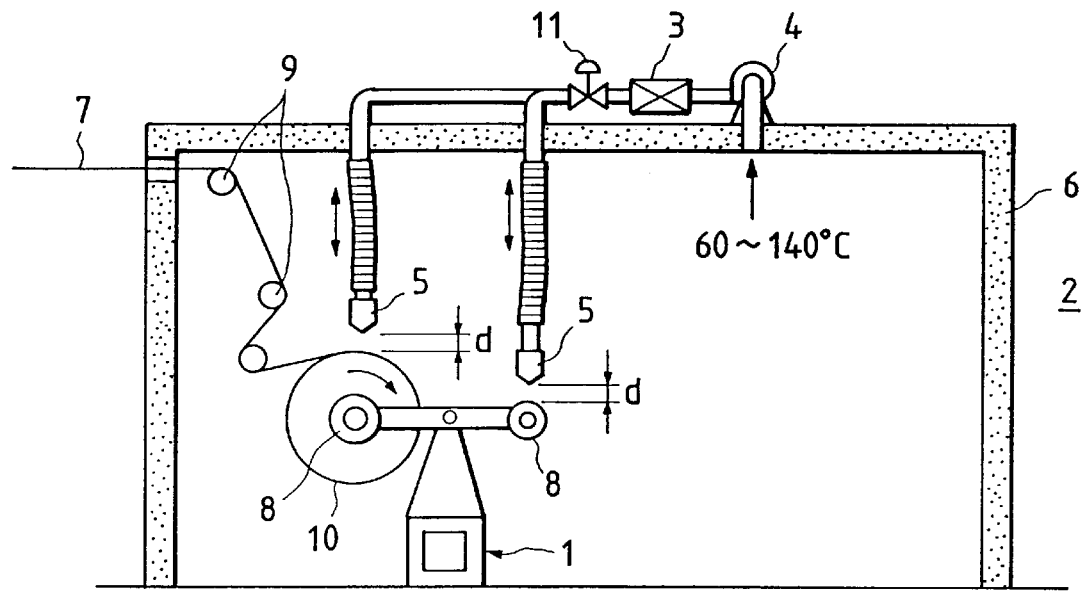
FIG. 1 is a side elevation view of an embodiment of a winding chamber in which a winding apparatus is installed.

Examples of a material for the polymer film for use in the present invention include polyesters such as polyethylene terephthalate, polyethylene naphthalate, etc., polyethylene, polystyrene, polyvinyl alcohol, polyvinyl chloride, Teflon, polyvinylidene chloride, nylon, polypropylene, polycarbonate, polyimide, polyamide imide, polyester imide and the like.

Of these, polyester films such as a polyethylene terephthalate film, a polyethylene naphthalate film and the like are particularly preferably used in the present invention as a photographic film support.

In the present invention, a winding apparatus is preferably installed in a winding chamber which encloses the minimum space necessary for surrounding the winding apparatus with a heat insulating material. In the winding chamber, other accessory apparatuses may also be installed. The heating temperature of a polymer film web upon winding operation is generally about the glass transition temperature of the film, preferably ranges from 60° C. to 140° C.

Prior to starting to wind a polymer film web, the temperature of a core for use in the winding is adjusted within the range of a heat treatment temperature ±30° C. by exposing the core directly to hot-air. When a web is wound onto a core having a temperature lower than the heat treatment temperature minus 30° C., thermal shrinkage by rapid cooling is caused in the web to generate surface defects such as wrinkles, scratches, ruggedness, etc. When a web is wound onto a core having a temperature higher than the heat treatment temperature plus 30° C., the mechanical strength of the web decreases to generate defects such as elongation, scratches and so on. By adjusting the core temperature to the range of a heat treatment temperature ±30° C., the above described surface defects are prevented from arising.

The temperature at which the core is heated can be regulated by controlling the temperature and jet pressure of hot-air, and the distance between the tip of an air nozzle and the core. Subsequently, in winding a polymer film web into a film roll, the winding tightness can be controlled by the jet pressure of hot-air from another nozzle. The jet pressure of hot-air for heating ranges from 100 to 1,000 mmAq.

In the winding method of the present invention, a non-contact temperature sensor for detecting the periphery temperature of a film roll under winding and a feedback system are preferably used, and thereby the temperature of hot-air from an air jet nozzle can be controlled to attain a temperature within the heat treatment temperature ±3° C. throughout the film roll. When an air jet nozzle is not used, the controllable temperature range becomes within the heat treatment temperature ±5° C. or more. As a result, winding wrinkles and starring of a film roll occur.

A core and a film roll are heated in the winding chamber enclosed by a heat insulating material. In the winding chamber are installed hot-air jet nozzles the number of which is equal or greater than the number of reels (from 2 to 4 reels in the case of turret style) with which reels the cores are fitted up, respectively. The nozzles can be moved forwards or backwards to their corresponding core(s) and film roll(s), and thereby the distance between the tip of hot-air jet nozzle and the core or the wound web surface can be maintained constant. As for the hot-air jet apparatus, the apparatus and method described in JP-A-59-20746 can be used in the present invention.

By the preheating of the core with a hot-air jet nozzle in accordance with the present method, the heating time for an annealing treatment can be reduced (to generally 10–20 minutes). On the contrary, when such a preheating is not conducted (the core is allowed to stand as it is in a thermostatic chamber before annealing), it takes at least 30 minutes to effect an annealing treatment. Therefore, it becomes impossible to heat the core that is to be used for next winding up to a predetermined temperature within each winding time of a cyclic winding operation where winding processes are continuously preformed by changing a core for winding one after another.

As described above, the core that is used for (next) winding can be secured to have a predetermined desired temperature by preheating it before a winder is loaded therewith.

Furthermore, by winding a polymer film web while the film web is exposed to hot-air, stretching or contraction from the periphery side to the core side of a film roll can be reduced, and thereby starring of the roll and generation of winding wrinkles and winding ruggedness during the winding operation can be prevented. Accordingly, the thus obtained polymer film web is optimum for a photographic film support.

A preferred embodiment of the winding chamber for use in the present invention is described in detail with reference to the accompanied drawing.

As shown in FIG. 1, a winding apparatus 1 is installed in a winding chamber 2 enclosed by a heat insulating material 6, and the interior of the winding chamber 2 is maintained at a temperature ranging from 60° C. to 140° C. The interior temperature of the winding chamber 2 is appropriately selected depending on the material of a polymer film web to be wound up. For example, suitable temperature for a polyethylene terephthalate film is from 60° C. to 70° C., and that for a polyethylene naphthalate is from 100° C. to 120° C.

The heating inside the winding chamber 2 is carried out mainly with the hot-air blowing directly against a core and a polymer film web. In addition to these hot-air blow, a heater for conductive and radiant heating may be installed in the winding chamber 2, if needed.

A polymer film web 7 generally has a thickness of from 10 to 100 μm, a width of from 150 to 1,500 mm, and a length of from 1,000 to 3,000 m per film roll.

The cylindrical cores 8 are placed in the winding chamber 2, and each loaded on separate turrets of a winding apparatus 1. The core 8 is heated until its temperature is raised to from 60° C. to 140° C. by a hot-air blow which is heated in an air-heater 3 and discharged from a hot-air jet nozzle 5 arranged so as to keep a predetermined distance d from the core. In FIG. 1, reference numeral 4 represents a fun. Examples of the hot-air jet apparatus for use in the present invention include an apparatus described in JP-A-59-20746. The hot-air jet nozzle of the apparatus can be moved upward and downward, and the position thereof is adjustable.

A polymer film web 7 is brought into contact with heating rollers 9 before it is wound. The winding operation of the film web 7 is performed while the film surface is exposed to hot-air from another hot-air jet nozzle 5 arranged separately. Thus, the temperature distribution in a film roll 10 becomes uniform throughout the film roll 10 from the core side to the periphery of the film roll. In other words, local differences in the degree of thermal shrinkage and expansion are not produced in the film roll. Therefore, the film roll is free from winding wrinkles and winding ruggedness. Further, the winding tightness of a film roll is controllable by appropriately adjusting the discharge pressure of hot-air from the nozzle 5 by a damper 11.

In another embodiment of the winding method for use in the present invention, the web is wound up while being subjected to a knurling processing so that the thickness of knurls formed along both side edges by an edge-thickening processing decrease gradually from the core side of the film roll toward the periphery side of the film roll.

In the present invention, the apparatus disclosed in JP-B-57-36129 is generally used for the knurling processing.

The thickness of knurls in the core side is generally from 10 to 50% of the web thickness so that the knurls can lift the web superposed thereon, to thereby reduce the surface pressure between each turns of the web in the film roll. As a result, uneven heat transmission can be prevented. Moreover, sharp swelling due to a foreign substance adhering to the core, cut-end-mark and imprints of a core texture can be prevented from occurring.

The thickness of knurls in the periphery side is less than the thickness of knurls in the core side and generally from 1 to 20% of the web thickness so that the thickness of the air space between each turns of the web is reduced. As a result, the generation of ruggedness with the lapse of time can be prevented.

For example, when the thickness of knurls in the core side is 30% of the web thickness, that in the intermediate part is made so that their thickness may be decreased gradually from the thickness in the core side to that in the periphery side, and the thickness of knurls in the periphery side is 5% of the web thickness. The optimum knurls thickness ratio between the core side and the periphery side depends on material used for the film, web thickness and length.

The gradual decrease in thickness of knurls in the present invention can be achieved by controlling the voltage when a corona discharge treatment is used as an edge-thickening processing, by controlling the roughness and applied pressure when a mechanical processing is used, or by controlling the hot-air temperature when a hot-air blowing processing is used.

As soon as the winding of the film web 7 into a film roll 10 is finished, the film roll is transferred from the winding chamber 2 into a thermostatic chamber (which is not drawn in FIG. 1) while keeping the temperature of the film roll. In this transfer step, the surface of the film roll undergoes a drop in temperature by exposure to the atmosphere of ordinary temperature. However, the drop in temperature arises in the zone extending from the periphery to the several turns. Therefore, the influence thereof is slight. In the thermostatic chamber, an annealing treatment is generally carried out for a period ranging from 6 minutes to 1,500 hours at a temperature ranging from 60° C. to 140° C.

In the heat treatment method for annealing a film roll for use in the present invention, the film roll is enclosed with heat insulating panels, which panels are arranged to form a chamber for surrounding the film roll, for enabling the surroundings to be heated as uniformly as possible and further ensuring the saving of heat. A hot-air duct is connected to the port, and the interior of the chamber surrounded by the heat insulating panels is heated by a hot-air blow from the hot-air duct. The annealing treatment of the present invention may be conducted under the situation where one film roll mounted on each flatcar is enclosed into a chamber, or under the situation where two or more of the film rolls mounted on a flatcar are enclosed together into one chamber.

The phrase "rotating the core intermittently at a rotary speed of from 0.04 to 4 revolutions per hour" used herein means rotating the core by dividing one round (360°) of the core into from 2 (180°) to 12 (30°) sections, and by interposing a standstill for some definite time between each divided rotates so that the core rotates at a rotary speed of from 0.04 to 4 revolutions per hour (abbreviated as "r.p.h.", hereinafter) as a whole. The ratio (R) between standstill time and rotating time may be from 0 to 20, preferably from 0 to 10. The continuous or intermittent rotation as described above enables the entire film roll to be uniformly heated. Furthermore, the uniform forced heating inhibit conventionally observed air leakage from spaces between films which is due to film shrinkage upon cooling. Therefore, the film roll is free from elliptical distortion and wrinkles. When the rotating speed is slower than 0.04 r.p.h., or when the ratio R is larger than 20, the film roll may suffer an elliptical distortion. On the contrary, when the rotating speed is faster than 4 r.p.h., the film roll is apt to suffer telescoping. Further, the combination of forced heating with the rotation of a film roll can prevent localization of heat, and can promote the annealing of the film roll. The blowing speed of hot air is preferably from 1 to 200 m/sec.

Figure 2:
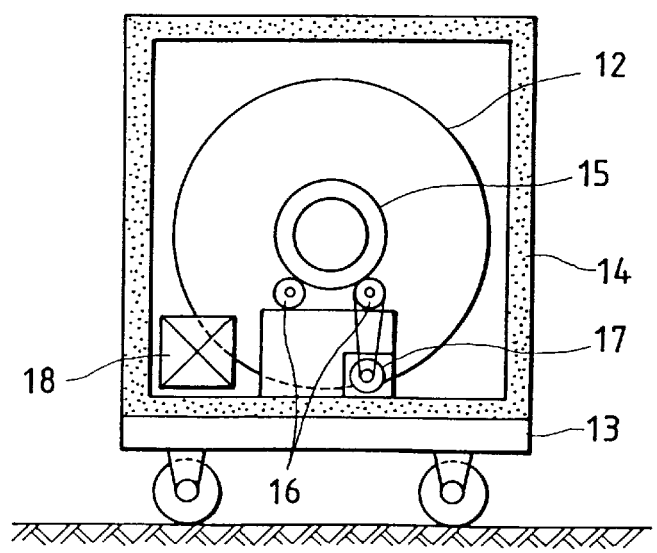
FIG. 2 is a side elevation view of an embodiment of the heat treatment apparatus in accordance with the present invention.

A preferred embodiment of the heat treatment apparatus for annealing a film roll of the present invention is shown in FIG. 2. The apparatus comprises a flatcar 13 on which a wound film roll 12 is mounted, heat insulating panels 14 for enclosing the film roll 12 mounted on the flatcar 13, a pair of rollers 16 which support a core 15 of the film roll 12, a motor 17 which provide power for rotating the core 15 of the film roll 12 via the rollers 16 at a speed of from 0.04 to 4 revolutions per hour, and a port 18 for connecting a hot-air duct thereto which port is provided in one of the panels 14 that faces one edge of the film roll 12. The heat-insulating panels may be arranged to form one chamber per one flatcar. Alternatively, the panels may be arranged to form one chamber over a plurality of flatcars each having thereon mounted a film roll. In this case, rollers 16 for each film rolls may be interlocked each other for being rotated by one motor, and the port 18 may be one common port.

The temperature in the annealing chamber is selected appropriately depending on the material of a polymer film to be annealed. For example, suitable annealing temperature for a polyethylene terephthalate film is from 60° C. to 70° C., and that for a polyethylene naphthalate is from 100° C. to 120° C.

The annealing treatment is preferably carried out as follows. A winding part is put in a chamber and thereby the annealing treatment is started in the chamber simultaneously with a winding operation as described in JP-A-7-195381. In this case, a further annealing treatment is carried out in the chamber surrounded by heat-insulating panels on a flatcar according to the present invention.

When a film roll having a width of 1,500 mm and a diameter of a wound roll of 700 mm is subjected to a heat treatment at the glass transition temperature of a web, annealing treatment is uniformly pervaded throughout the web by heat-treating over a period of about 120 hours while the film roll is rotated intermittently or continuously at a speed of from 0.04 to 4 r.p.h. by the motor 17 via the rollers 16. (As for the port 18, the purpose thereof can sufficiently be served with providing only one port.)

If the film roll 12 is not rotated upon heat treatment, some portions of the film roll come to have a lower temperature, and thereby the heat treatment at the glass transition temperature becomes impossible to result in frequent occurrence of conventional surface defects.

The heat treatment method of the present invention is a batch treatment carried out for every film roll or on every flatcar, and can achieve raid annealing treatment. Compared with conventional treatment methods wherein a large-sized thermostatic chamber is used as the space for annealing, it is therefore easy to respond to changes in the number of film rolls to be annealed.

Upon cooling after the annealing treatment, the web shrinks, but softening of the web in the cooling step is not remarkable. The annealed film roll can be sent for a next step while the temperature thereof is kept at the annealing temperature without via the cooling step after the annealing treatment. In this case, the film roll is gradually cooled during transportation, and thereby effects of inhibiting the film roll from starring and generating wrinkles are produced.

In the present invention, the unwinding operation for a next step after an annealing treatment, where the film roll is heated to be in a high temperature state, is preferably carried out while the web is still in a high temperature state, preferably before the web temperature is decreased by 20° C. from its glass transition temperature. As a result, surface defects caused by shrinking of the film upon cooling, such as telescoping, starring wrinkles and wrinkles around a core, can be reduced. This is because the film roll as wound is avoided suffering from distortion due to film shrinkage arising from drop in temperature by cooling the film roll while unwinding, instead of cooling a film roll as it is in the rolled condition. Additionally, the term "a next step" as used herein means a step of coating a subbing composition, a step of cutting the film, or etc.

In the present invention, one or more of the above described methods and an apparatus may be used in combination as appropriately to prepare a photographic film support.

The present invention will be described in detail with reference to the following Examples. However, the invention should not be construed as being limited to these Examples.

EXAMPLE 1

A polyethylene naphthalate film roll having a width of 1,500 mm and a diameter of a wound roll of 700 mm is annealed at a temperature of 120° C. over a 120- hour period by means of a heat treatment apparatus as shown in FIG. 2. The relation between the rotary speed of the film roll during the annealing treatment and occurrence of surface defects were examined. The results obtained are set forth in Table 1.

TABLE 1

| | Rotating Speed of Film Roll | | | |
|---|---|---|---|---|
| Surface Defects | 0 (r.p.h.) | 0.04 (r.p.h.) | 4 (r.p.h.) | 10 (r.p.h.) |
| Starring | 0 | 0 | 0 | x |
| Winding Wrinkles | 0 | 0 | 0 | x |
| Winding Ruggedness | x | 0 | 0 | 0 |
| Telescoping | 0 | 0 | 0 | x |
| Ununiformity in Heat Treatment | x | 0 | 0 | 0 |

0: no occurrence
x: occurrence

As can be seen from Table 1, the heat treatment using the present method and apparatus was successful in preventing surface defects such as starring, winding wrinkles and winding ruggedness which conventionally occur in a film roll upon annealing treatment of the balk roll, to thereby considerably reduce the loss due to the surface defects.

Furthermore, it has been proved that the present method and apparatus make it possible to prevent the localization of heat in the annealing treatment, to achieve a uniform and rapid heat treatment, and further to simplify a flatcar structure. In addition, it becomes easy to respond to changes in the number of film rolls to be annealed.

EXAMPLE 2

A polyethylene terephthalate film web having a thickness of 100 μm and a width of 1,500 mm was wound into a film roll having a winding diameter of 700 mm while being subjected to an edge-thickening processing to form knurls along both side edge parts of the polyethylene terephthalate film web.

The edge-thickening processing was performed so that the knurl thickness at leading web end that is to be brought into contact with the core was a 30% of the web thickness, and the knurl thickness gradually decreased toward the other end to reach a 5% of the web thickness at the trailing end.

Thereafter, the wound film roll was subjected to an annealing treatment. As a result of successive winding and annealing treatment of the web, sharp swelling and the cut-end-mark were observed only in the zone extending from the core to the fifth turn of the web, and the periphery part of the film roll was free from ruggedness.

COMPARATIVE EXAMPLE 1

The winding and annealing operations were carried out in the same manner as in Example 2, except that the knurl thickness was adjusted to the constant value of a 20% of web thickness in the length direction of the web. As a result, defects in the core side were observed in the zone extending from the core to the hundredth turn of the web, and the defects in the periphery side observed in the zone extending from the periphery to the 150th turn.

EXAMPLE 3

A roll of a polyethylene terephthalate film web (polyethylene terephthalate web) having a width of 1,500 mm and a winding diameter of 700 mm was subjected to a heat treatment at the glass transition temperature of the web, and then unwound for a next step while keeping the web temperature within the range of from its glass transition temperature to the temperature lower than the glass transition temperature by 20° C. As a result, telescoping and winding wrinkles due to thermal shrinkage of a web were not observed in the unwound web.

COMPARATIVE EXAMPLE 2

The same film roll as in Example 3 was cooled to room temperature (25° C.), and then unwound. As a result, winding wrinkles were generated inside the film roll, and the telescoping arose in the course of unwinding the film roll. Furthermore, dimensional change in the core material occurred, and thereby the film roll slipped on the core. As a result, the film roll cannot be unwound no longer.

In view of the results of Examples 2 and 3 and comparative Examples 1 and 2, it can be seen that by controlling the thicknesses of knurls from the core side to the periphery side in accordance with the present invention, sharp swelling, cut-end-mark and imprints of a core texture in the core side can be considerably reduced, and winding ruggedness in the periphery side can be prevented.

Furthermore, by starting the unwinding operation for a next step after the present annealing treatment while the roll film is in a high temperature state, telescoping and starring wrinkles which has hitherto been caused due to thermal shrinkage of a web upon cooling of the film roll can be completely removed.

While the invention has been described in detail and with reference to specific examples thereof, it will be apparent to one skilled in the art that various changes and modifications can be made therein without departing from the spirit and scope thereof.

What is claimed is:

1. A heat treating apparatus for annealing a film roll of a polymer film web wound around a cylindrical core, said apparatus comprising:

a flatcar on which the film roll is mounted;

a heat insulating panel which is arranged to form a chamber for surrounding the film roll on the flatcar;

a pair of rollers which supports the core;

a motor which is coupled to one of the rollers and which provides power for rotating the core intermittently or continuously via the rollers; and a port for introducing hot air into the chamber which is provided in one side of the chamber that faces one edge of the film roll.

* * * * *